May 2, 1950     G. C. FAIRBAIRN     2,506,352
THERMOSTAT
Filed Sept. 13, 1947
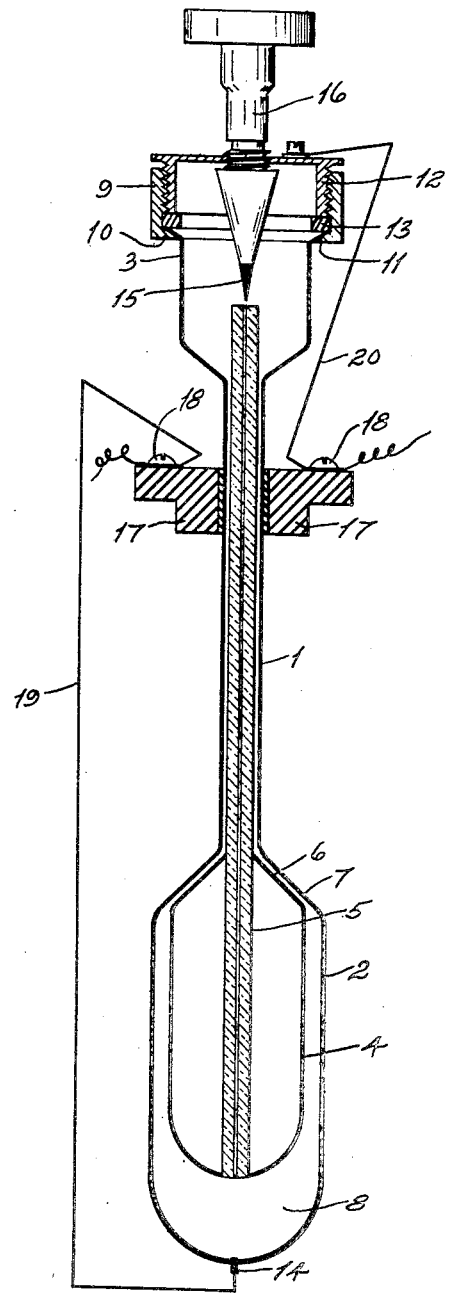
INVENTOR.
GEORGE C. FAIRBAIRN
BY
ATTORNEYS Patented May 2, 1950

2,506,352

UNITED STATES PATENT OFFICE 2,506,352

THERMOSTAT

George C. Fairbairn, Port Arthur, Tex., assignor to The Texas Company, New York, N. Y., a corporation of Delaware Application September 13, 1947, Serial No. 773,880

8 Claims. (Cl. 200—141)

The invention concerns a thermostat for use in regulating the temperature of a body of liquid in which it may be immersed, and for other purposes.

The device of the invention is well adapted for use in regulating the temperature of water or other liquid baths as used in laboratories, where it is desired to maintain a constant temperature and where the temperature must be controlled precisely.

It is an object of the invention to provide a temperature regulating device adapted to control temperature with a high degree of precision.

It is a further object of the invention to provide a device which is simple and sturdy in construction and entirely reliable in operation.

The invention will be understood from the following description and the accompanying drawing, the single figure of which is a side elevation of the device.

Referring to the drawing, the device of the invention includes a vertically disposed tubular glass vessel 1 having an enlarged bulbous portion 2 at the bottom thereof and an enlarged funnel-shaped portion 3 at the top thereof. A hollow glass float 4 is receivable in the bulbous portion 2. A glass capillary tube 5 is formed integrally with the float 4 and extends upwardly through the float 4 and through the tubular glass vessel 1 above the float 4.

The upper surfaces of the float 4 and the bulbous portion 2 are tapered at 6 and 7, respectively, and are formed so as to provide a ground glass joint between them.

A body of mercury 8 is disposed within the bulbous portion 2 and is adapted to flow upwardly through the capillary tube 5 upon heating.

Closure means is provided for the upper end of the funnel-shaped portion. The closure means comprises an internally threaded ring 9 having an inwardly extending lip 10 adapted to engage the rim 11 of the funnel-shaped portion 3 from the under side, an externally threaded cap 12 adapted to be screwed into the internally threaded ring 9 and a sealing ring 13 adapted to be retained in place by the cap 12.

A metal electrode 14 is mounted in the bottom of the bulbous portion 2. A carbon electrode 15 is mounted in the cap 12 and is adapted to contact a column of mercury rising through the capillary tube 5. The electrode 15 is preferably made of carbon for the reason that carbon electrodes are not wetted by mercury and mercury therefore does not adhere thereto. Screw propelled means 16, which may include parts (not shown) normally included in an ordinary mechanical pencil, is provided for advancing and retracting the carbon electrode 15 with respect to the upper end of the capillary tube 5.

A block 17, which may be split diametrically into two halves, may be fitted about the tubular vessel 1 for supporting the device in an opening in the top of a water bath or the like (not shown). Binding posts 18 may be secured to the two halves of the circular block 17 for use in connecting lead wires 19 and 20 to the electrodes 14 and 15 respectively. The circular block may be made of non-conducting material or the two halves thereof may be separated by non-conducting material.

The electrodes 14 and 15 may be connected to a relay in a system for actuating heating or cooling means (not shown) in a manner well known. When the device of the invention is used to control the temperature of a water bath, for example, the arrangement may be such that heating is discontinued when the electrode 15 contacts a column of mercury rising through the capillary tube 5.

In operation, the bulb 2, from which the air is preferably exhausted, is filled with the mercury 8 at a temperature lower than it is expected to encounter in operation and the float 4 is buoyed upwardly to close the seal at the ground joint 6—7. When the device is immersed in the bath to be controlled the heat from the bath causes the mercury to expand upwardly through the capillary tube 5 until it touches the carbon contact 15. As stated in the foregoing paragraph the electrodes 14 and 15 may be connected in a circuit in such manner that when the circuit is closed by contact between the mercury and the member 15 the heat for the bath will be cut off. As the bath cools, the mercury recedes through the tube 5 until the electrical contact is broken whereby the heat for the bath will again be turned on. This cycle will continue to be repeated indefinitely or until the upper contact 15 is adjusted. If a higher temperature is desired the member 15 will be raised out of contact with the mercury and a globule of the mercury will be allowed to form at the top of the tube 5. This globule can be jarred off into the flaring member 3 and the contact member 15 will then be adjusted to a desired point above the tube 5. The operation will then continue as described above. If a still higher temperature is desired more mercury will have to be jarred off as described above and the member 15 set at a still higher elevation. If a lower temperature is desired the tube 5 should be pushed downwardly breaking the seal 6—7 to permit the mercury which may have been jarred off from the top of the tube 5 to reenter the bulb 2 so that there will be enough mercury in the bulb to effect the control at the lower temperature.

In an actual test of a device constructed as described, liquid temperature was controlled to within plus or minus .075° F. at a working temperature 200° F. With a smaller capillary 5, still greater sensitivity could be obtained.

Obviously many modifications and variations of the invention, as hereinbefore set forth, may be made, without departing from the spirit and scope thereof, and therefore only such limitations should be imposed as are indicated in the appended claims.

I claim:

1. A thermostatic device comprising a vertically elongated vessel having enlarged top and bottom portions connected by a tubular portion, a float member within said bottom portion, a capillary tube extending through said float member and upwardly through said tubular portion to terminate within said top portion, the upper end of said float member and the bottom portion of the vessel being shaped to provide a seal when the float member is in its uppermost position, a body of mercury within said bottom portion adapted to buoy said float member upwardly to effect said seal and, when heated, to expand upwardly through said capillary tube, means for making electrical contact with the mercury in said bottom portion, and a second electrical contact within said upper portion adapted to be contacted by the mercury reaching the top of said capillary tube.

2. A thermostatic device for closing an electrical circuit when the temperature of a fluid reaches a predetermined value, comprising a vertically elongated vessel adapted to be partially immersed in said fluid and having enlarged top and bottom portions connected by a tubular portion, a float member within said bottom portion, a capillary tube extending through said float member and upwardly through said tubular portion to terminate within said top portion, the upper end of said float member and the bottom portion of the vessel being shaped to provide a seal when the float member is in its uppermost position, a body of mercury within said bottom portion adapted to buoy said float member upwardly to effect said seal and, when heated, to expand upwardly through said capillary tube, an electrode in said bottom portion in continuous contact with said mercury, and a vertically adjustable carbon electrical contact within said upper portion directly above the upper end of said capillary tube and adapted to be contacted by the mercury reaching the top of said capillary tube.

3. A thermostat comprising a vertically disposed tubular vessel having enlarged portions at the ends thereof, a float receivable in the lower portion of the tubular vessel, a capillary tube extending upwardly through the float and through the tubular vessel above the float, said float and said tubular vessel having cooperating surface portions adapted to seal the lower end of the annular space between the capillary tube and the tubular vessel when the upper end of the float engages the upper end of the lower enlarged portion of the tubular vessel, a body of mercury disposed within the lower portion and adapted to flow upwardly through the capillary tube upon being heated, an electrode adapted to contact the body of mercury in the lower portion, and an electrode adapted to contact the mercury reaching the top of the capillary tube.

4. A thermostat comprising a vertically disposed tubular vessel having a lower enlarged portion adapted to contain a quantity of mercury and an upper flaring portion, a float receivable in said enlarged portion, a capillary tube extending upwardly through the float and the tubular vessel above the float, the upper end of said float and the bottom portion of the tubular vessel having cooperating surfaces adapted to seal the lower end of the annular space between the capillary tube and the tubular vessel when the upper end of the float engages the upper end of the enlarged portion of the tubular vessel, an electrode adapted to contact said mercury disposed within the lower portion, and an electrode adapted to contact a column of mercury rising to the top of the capillary tube.

5. A thermostat comprising a vertically disposed tubular vessel having an enlarged bulbous portion at the bottom thereof and an enlarged funnel-shaped portion at the top thereof, a float receivable in the bulbous portion, a capillary tube formed integrally with the float and extending upwardly through the float and through the tubular vessel above the float, the upper end of said float and the bottom portion of the tubular vessel having cooperating surfaces adapted to seal the lower end of the annular space between the capillary tube and the tubular vessel when the upper end of the float engages the upper end of the bulbous portion of the tubular vessel, a body of mercury disposed within the bulbous portion and adapted to flow upwardly through the capillary tube upon being heated, an electrode adapted to contact the body of mercury in the bulbous portion, and a vertically adjustable electrode adapted to contact a column of mercury rising through the capillary tube.

6. A thermostat comprising an elongated vertically disposed vessel having an enlarged bulbous bottom portion and an enlarged funnel-shaped top portion connected by a tubular portion, a float receivable in said bulbous portion, a capillary tube formed integrally with the float and extending upwardly through the float and through said tubular portion, the upper surfaces of the float and the bulbous portion being shaped to provide a ground joint between them, a body of mercury disposed within the bulbous portion and adapted to flow upwardly through the capillary tube upon being heated, an electrode adapted to contact the body of mercury in the bulbous portion, and an electrode adapted to contact a column of mercury rising through the capillary tube.

7. A thermostat comprising a vertically disposed tubular glass vessel having an enlarged bulbous portion at the bottom thereof and an enlarged funnel-shaped portion at the top thereof, a glass float receivable in the bulbous portion, a glass capillary tube formed integrally with the float and extending upwardly through the float and through the tubular glass vessel above the float, the upper surfaces of the float and the bulbous portion being shaped to provide a ground glass joint between them, a body of mercury disposed within the bulbous portion and adapted to flow upwardly through the capillary tube upon being heated, an electrode adapted to contact the body of mercury in the bulbous portion, an electrode adapted to contact a column of mercury rising through the capillary tube, and means for advancing and retracting the last mentioned electrode with respect to the upper end of the capillary tube.

8. A thermostat comprising a vertically disposed tubular glass vessel having an enlarged bulbous portion at the bottom thereof and an enlarged funnel-shaped portion at the top thereof, a glass float receivable in the bulbous portion, a glass capillary tube formed integrally with the float and extending upwardly through the float and through the tubular glass vessel above the float, the upper surfaces of the float and the bulbous portion being tapered and adapted to form a ground glass joint between them, a body of mercury disposed within the bulbous portion and adapted to flow upwardly through the capillary tube upon being heated, a closure for the upper end of the funnel-shaped portion, a metal electrode adapted to contact the body of mercury in the bulbous portion, a carbon electrode adapted to contact a column of mercury rising through the capillary tube, and screw propelled means mounted in said closure for vertically advancing and retracting the carbon electrode with respect to the upper end of the capillary tube.

GEORGE C. FAIRBAIRN.

No references cited.